May 3, 1932. M. F. BERG 1,856,531
LATCH FOR BALING PRESS DOORS
Filed Oct. 30, 1929
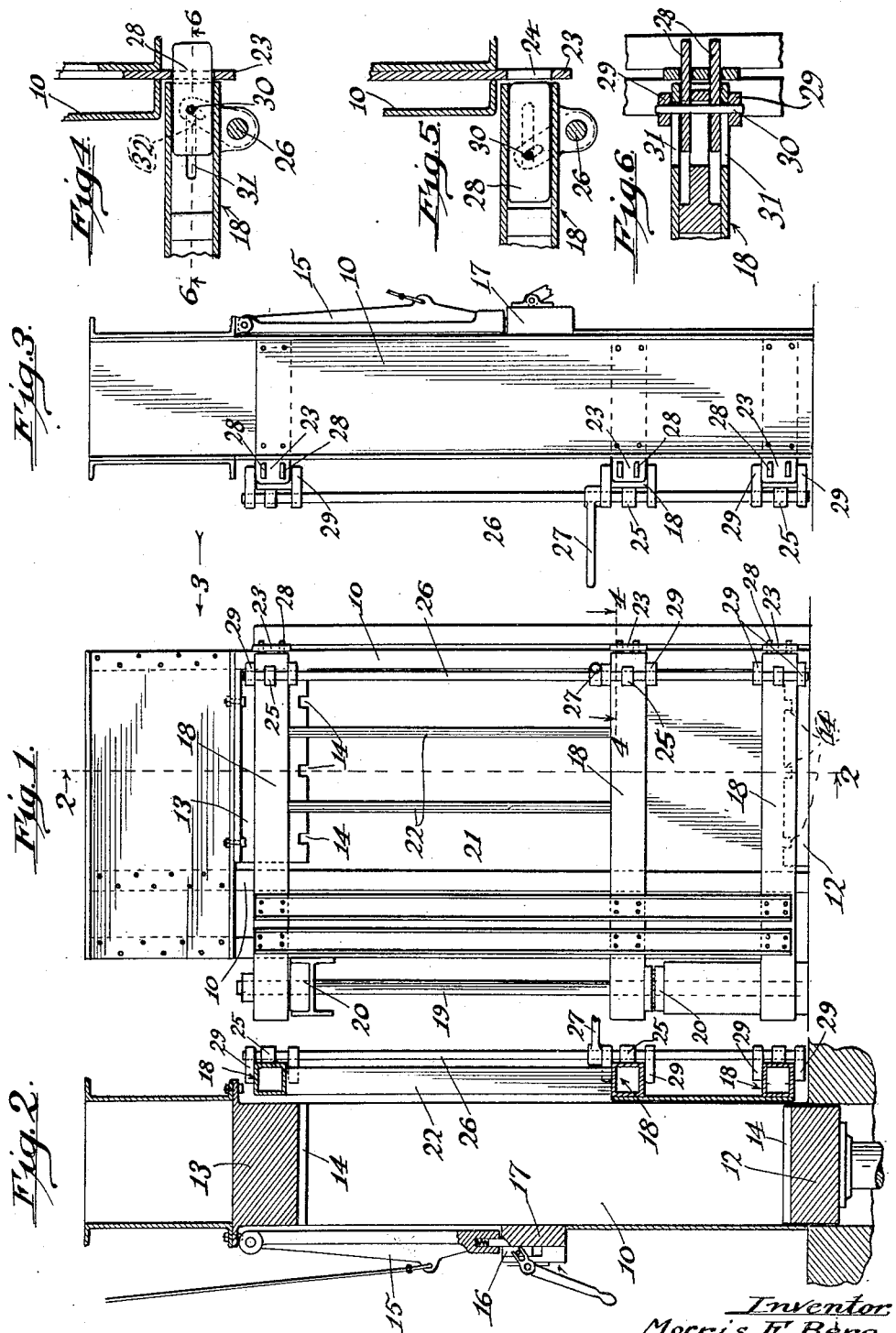
Inventor
Morris F. Berg.
by Martin P. Smith
Attorney.

Patented May 3, 1932

1,856,531

UNITED STATES PATENT OFFICE

MORRIS F. BERG, OF LOS ANGELES, CALIFORNIA

LATCH FOR BALING PRESS DOORS

Application filed October 30, 1929. Serial No. 403,503.

My invention relates generally to flat newspaper baling presses and more particularly to a safety door therefor and the principal objects of my invention are, to provide a door for flat newspaper baling presses that will effectually prevent the stack of papers that is being compressed within the baling press from bursting out through the opening through which the papers are delivered into the baling chamber of the press, further, to provide a safety door that may be readily opened and closed during operation of the press and further, to provide a safety door that will permit metal bands or tie wires to be placed around the bale of paper within the press while the door is closed.

In certain types of flat newspaper baling presses now in general use one side of the chamber in which the bales are compressed is left open in order to permit the operator to pass the metal bands or tie wires around the bale while the same is under pressure and in these forms of presses there is more or less danger of injury to the operators as a result of the bundle of papers bursting outwardly through the opening while under a high degree of pressure and which action results from irregular piling of the newspapers that make up the bale.

It is one of the principal objects of my invention, to provide a door for newspaper baling presses that may be readily manipulated to permit a bale to be inserted and to provide means for locking the door when closed and thus the operator may, without danger of injury resulting from the bursting of the bale, place the metal bands or tie wires around the bale to confine the same when said bale has been compressed to the desired degree.

With the foregoing and other objects in view, my invention consists in certain novel features of construction and arrangement of parts that will hereinafter be more fully described and claimed and illustrated in the accompanying drawings, in which:

Fig. 1 is a front elevational view of a paper baling press and showing my improved safety door in position thereupon.

Fig. 2 is a vertical section taken on the line 2—2 of Fig. 1.

Fig. 3 is a side elevational view of the frame of the baling machine and showing my improved door in position thereupon.

Fig. 4 is a horizontal section taken on the line 4—4 of Fig. 1.

Fig. 5 is a horizontal section similar to Fig. 4 and showing the latching bolts in withdrawn or retracted position so as to permit the door to be opened.

Fig. 6 is a vertical section taken on the line 6—6 of Fig. 4.

Referring by numerals to the accompanying drawings which illustrate a practical embodiment of my invention, 10, 10 designate the side walls of the baling chamber, which walls are disposed to the sides of an opening 11, through which operate a pressure head 12, the latter being carried by a piston and said head and piston may be actuated by any suitable means, for instance, steam, compressed air or water.

Connecting the upper portions of the side walls 10 is a fixed head 13 and formed in the underside of this fixed head and in the upper surface of the pressure head 12 are transversely disposed grooves or channels 14 for the accommodation of the metal bands or wires that are utilized for securing the bales that are compressed in the machine. Hinged on the rear upper portion of the baling machine is a counterbalanced gate or door 15 that is adapted to swing upwardly and outwardly so as to permit the compressed bales to be discharged from the baling chamber and when this door or gate is closed its lower end is secured by means of a manually operable dog or latch 16 to a fixed cross bar 17.

The safety door contemplated by my invention, is arranged so as to close the front side of the baling chamber and said door comprises upper, lower and intermediate cross rails or bars 18 and on the left-hand side of the door structure these bars or rails are connected to a vertically disposed rod 19 that serves as a hinge for the door and said rod is mounted in suitable anti-friction bearings 20 that are supported on fixed parts of the door frame.

Connecting the left hand portions of the rails 18 are upright bars or rails 21 and connecting the intermediate portions of the upper and intermediate rails 18 and directly in front of the baling chamber are comparatively heavy upright bars 22.

These upright bars 22 are disposed so that they occupy positions between the grooves or channels 14 in the fixed and movable heads 13 and 12, thus permitting the operator to readily position and manipulate the metal bands or wires that are applied to the bale for confining same in compressed condition.

Secured to and projecting outwardly from the right hand one of the upright side members of the baling machine and in the same horizontal planes with the rails or bars 18 are plates 23, in which are formed apertures 24 and these plates serve as keepers for the latching bolts that are carried by the bars or rails 18.

Journaled in bearings 25 that project outwardly from the right hand portions of the beams or rails 18 is an upright shaft 26 and secured to the intermediate portion thereof, just above the intermediate one of the bars 18 is an outwardly projecting handle 27.

Arranged for sliding movement in the ends of the beams or bars 18 are latched members 28 that are adapted to enter the apertures 24 in the keepers 23.

Secured to shaft 26 and projecting inwardly over and below each bar 18 are short crank arms 29.

Carried by the intermediate portion of each pair of latch bolts 28 is a vertically disposed pin 30 that passes through longitudinally disposed slots 31 that are formed in the upper and lower walls of the beam or bar 18 and said pins also pass through short slots 32 that are formed in the inner ends of the crank arms 29 and which last mentioned slots are radially disposed relative to the axis of the shaft 26.

In the operation of my improved safety door the same is swung into full open position and a stack of papers is now delivered into the pressure chamber above head 12 and which latter is at its lower limit of movement, as illustrated in Fig. 2.

The door is now swung into closed position and handle 27 is swung toward the lefthand, thereby partially rotating shaft 26 and swinging the crank arms 29 outwardly toward the ends of the bars 18. This action moves the pins 30 lengthwise through the slots 31 and radially through the slots 32 and the forward or outer ends of the latching bolts 28 will pass through the apertures 24 in the keepers 23, thereby securely latching the door in closed position.

The pressure head 12 is now caused to move upwardly, thereby compressing the bale of papers within the upper portion of the bailing chamber behind door or gate 15 and when said bale is compressed to the desired degree, the operator, positioned directly in front of the safety door, may insert the bailing straps or wires through the grooves 14 in the fixed and movable heads of the press and unite the ends of said bailing straps or wires in the usual manner while the bale is under compression.

During this operation the operator is protected against injury as a result of the bale bursting while under relatively high pressure.

After the baling straps or wires have been properly applied to the bale, head 12 is lowered a short distance and door or gate 15 is released and swung upwardly in order to permit the removal of the bale from the baling chamber.

To open the safety door so as to permit a subsequent stack of papers to be positioned in the baling chamber, handle 27 is swung toward the right hand, thereby rocking shaft 26 and swinging arms 29 toward the left hand, thereby withdrawing the latching bolts 28 from the keepers 23.

Thus it will be seen that I have provided a safety door for paper baling machines that is relatively simple in construction, inexpensive of manufacture, capable of being readily swung from one position to another and which door affords a maximum degree of protection to the operator while the bale is being compressed and while the baling straps or wires are being placed around the compressed bale.

It will be understood that minor changes in the size, form and construction of the various parts of my improved safety door for paper baling machines may be made and substituted for those herein shown and described without departing from the spirit of my invention, the scope of which is set forth in the appended claims.

I claim as my invention:

1. In a safety door for paper baling presses, a latch comprising a plurality of horizontally disposed tubular members arranged on the outer face of the door, a pair of latching bolts arranged for sliding movement in the end of each tubular member, a vertically disposed shaft journaled in bearings on said tubular members, a handle for actuating said shaft, arms projecting inwardly from said shaft above and below said tubular members, pins seated in the latching bolts and projecting through longitudinally disposed slots in the tubular members and said arms provided with slots for the reception of the ends of said pins.

2. In a safety door for paper baling presses, a latch comprising a plurality of horizontally disposed tubular members arranged on the outer face of the door, a pair of latching bolts arranged for sliding movement in the end of each tubular member, fixed slotted keepers projecting from the door frame for receiving said latching bolts when the same are projected, pins seated in each pair of latching bolts and projecting through longitudinally disposed slots in the tubular members and manually operable means mounted on said tubular members for simultaneously imparting movement to all of the pairs of latching bolts.

In testimony whereof I affix my signature.

MORRIS F. BERG.